United States Patent
Sirivara et al.

(10) Patent No.: US 7,185,084 B2
(45) Date of Patent: Feb. 27, 2007

(54) SERVER-SIDE MEASUREMENT OF CLIENT-PERCEIVED QUALITY OF SERVICE

(75) Inventors: Sudheer Sirivara, Hillsboro, OR (US); Jeffrey S. McVeigh, Portland, OR (US); Robert J. Reese, Lake Oswego, OR (US); Gianni G. Ferrise, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 566 days.

(21) Appl. No.: 09/947,429

(22) Filed: Sep. 5, 2001

(65) Prior Publication Data

US 2003/0046384 A1 Mar. 6, 2003

(51) Int. Cl.
*G06F 15/173* (2006.01)
*G06F 9/44* (2006.01)
*G06F 13/10* (2006.01)
*G06F 13/12* (2006.01)

(52) U.S. Cl. ............................... 709/224; 703/21
(58) Field of Classification Search ............... 709/203, 709/223–225, 230–235; 703/21, 22
See application file for complete search history.

(56) References Cited

U.S. PATENT DOCUMENTS

| 5,822,543 | A  | * | 10/1998 | Dunn et al. ............... 709/224 |
| 6,269,330 | B1 | * | 7/2001  | Cidon et al. ............... 714/43 |
| 6,442,141 | B1 | * | 8/2002  | Borella et al. ............. 370/248 |
| 6,721,686 | B2 | * | 4/2004  | Malmskog et al. ......... 702/186 |
| 2002/0055999 | A1 | * | 5/2002  | Takeda ..................... 709/224 |
| 2002/0198684 | A1 | * | 12/2002 | Gross et al. ............... 702/186 |
| 2003/0046383 | A1 | * | 3/2003  | Lee et al. ................. 709/224 |

* cited by examiner

*Primary Examiner*—Krisna Lim
*Assistant Examiner*—Sean Reilly
(74) *Attorney, Agent, or Firm*—Steve D. Yates

(57) ABSTRACT

Server-side determination of quality of service received by a client. Content is transmitted from the server to the client according to a protocol. During transmission, the protocol requires the client to periodically send the server statistics concerning the transmitting, e.g., lost packets, latency, or the like. The server simulates the network connection between the client and server based at least in part on the received statistics. The simulating allows the server to recreate, server-side, the content received by the client. The server may then compare what was sent to the client, versus the recreated received content, to determine a quality of service received by the client.

23 Claims, 4 Drawing Sheets

SERVER-SIDE MEASUREMENT OF CLIENT-PERCEIVED QUALITY OF SERVICE

FIELD OF THE INVENTION

The invention generally relates to determining quality of service (QOS) for network delivery of content, and more particularly to the server-side measurement of quality of service of delivered content based on transmission-error statistics sent to the server by a recipient of the content.

BACKGROUND

Networks are designed to connect machines, such as computers and other devices, to other machines at other locations. With the advent of affordable high-bandwidth network connections, businesses and users have started to use networks to transfer bandwidth consuming multimedia content, such as news broadcasts, video conferences, audio and/or visual data, such as animations, voice, telephony, television, etc., and other transmittable data.

Storage and transmission requirements for content is not trivial. For example, a 30 second audiovisual content, at low resolution, may require several megabytes of data storage. Consequently, rather than requiring a client's media player to download an entire content before playing it, instead protocols were developed to allow content to be "streamed" to a client's player, e.g., the RealPlayer™ provided by Real Networks of Seattle, Wash., the Windows Media Player provided by Microsoft Corporation of Redmond, Wash., or players by Apple Computer, International Business Machines (IBM), Silicon Graphics, Sun Microsystems, etc., in real (or near-real) time.

Costly hardware, software expertise is required to maximize quality of service for streamed media. Therefore, businesses often use third-party media service vendors to provide content on behalf of a business. Typically the business requires the media service vendor to guarantee a minimum quality of service that is received by the client. For example, to maintain a respected public image, a high profile news company would require a certain level of quality of broadcasts received by a client.

Determining received quality of service currently requires a recipient of content to execute an application program designed to extract portions from received content for comparison with corresponding portions of content transmitted by a server. However, requiring execution of the application program introduces undesirable computational and resource overhead for the client, privacy concerns, as well as a communication burden inherent to the client or server having to transmit to the other party a portion of content for use in the comparison. That is, to perform a comparison, either the client sends a received content portion to the server, or the server sends a sent content portion to the client.

BRIEF DESCRIPTION OF THE DRAWINGS

The features and advantages of the present invention will become apparent from the following detailed description of the present invention in which.

DETAILED DESCRIPTION

Figure 1:
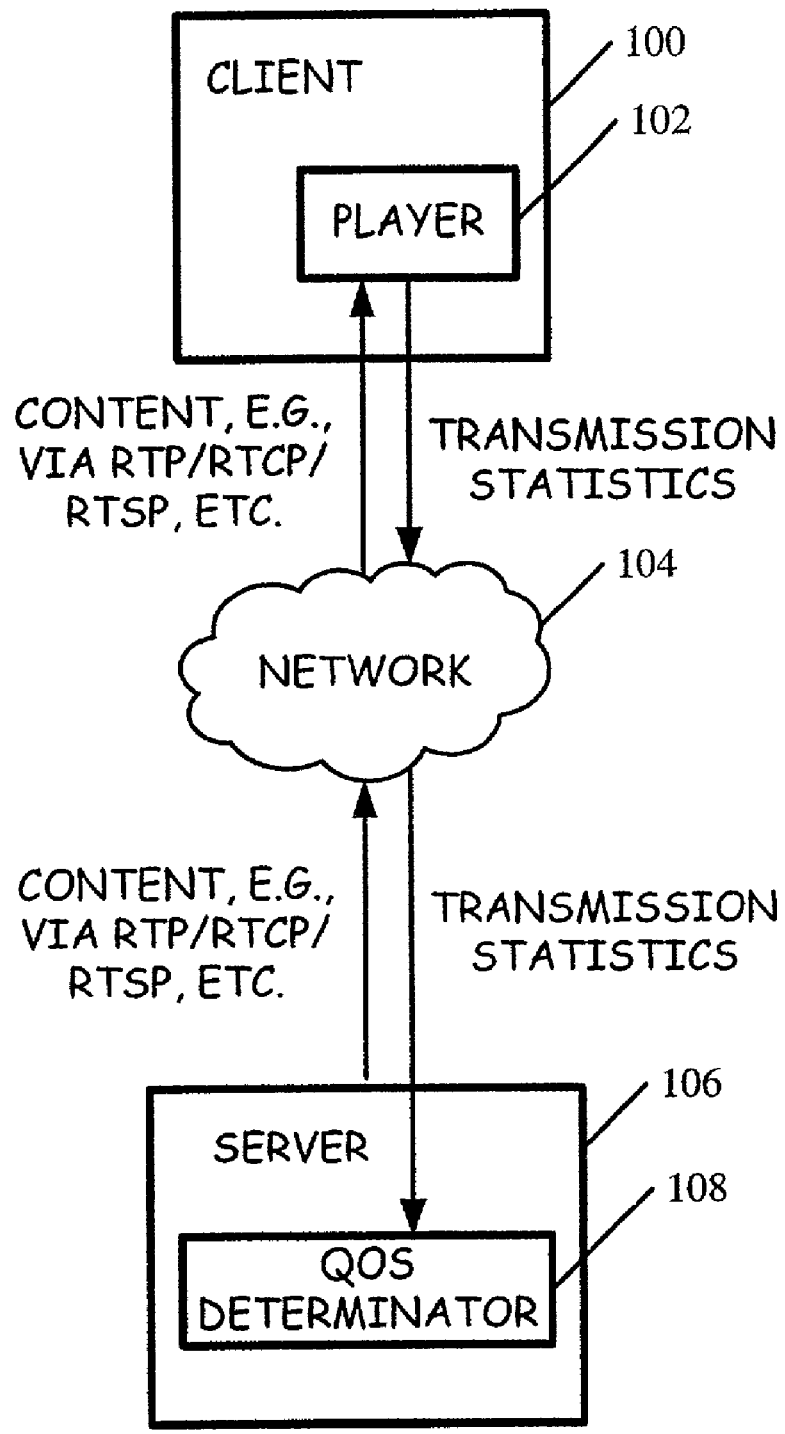
FIG. 1 is a simplified system diagram according to one embodiment of the invention.

Various embodiments are disclosed that remove the need for a server or a client to send the other end point extracted portions of content in order to determine client-perceived quality of service for a client-received content.

It is assumed herein that the Real-time Transport Protocol (RTP), Real-Time Control Protocol (RTCP), and Real Time Streaming Protocol (RTSP) underlie delivery of content to the client, since these protocols are well known and used by common content players, e.g., RealPlayer™ or other media players supporting RTP. It will be appreciated by one skilled in the art that these protocols are discussed herein for exemplary purposes only due to their broad familiarity by artisans and that any protocol providing the signaling characteristics relied upon herein, such as identifying lost frames and network latency, may be used for server-side determination of client-perceived quality of service.

Generally, RTP is a transport protocol for real time data, and provides a timestamp, sequence number, data loss detection, security, content identification, and other data relevant to real time data delivery. RTP can be used in a unicast or multicast context. Under RTP, content is broken into time stamped data packets that allow a receiving player, such as RealPlayer™, to reconstruct original timing for the content, to determine when data has been lost or delayed, and to synchronize different data streams (see RTSP below). When there are multiple audio and/or video streams, streams may have their own RTP session to allow selective reception, such as according to client or global preferences.

RTP may operate in conjunction with RTCP to provide quality of service information to a server providing content to a client. In accord with the RTCP protocol, a client receiving content periodically sends the server data describing the quality of service received by the client. In particular, the client sends "receiver report" data comprising identification of packets not received by the client, and timestamps for determining delay (or latency) between the server and client. The client may also send other session characteristic data, such as the highest packet number received for the content, jitter statistics, etc, and the client may be configured to send back "application specific functions" by way of a plug-in for a client player, or other program mechanism, to allow sending arbitrary data not presently supported by the protocol.

RTSP describes how to stream the content from a server to a client. Streaming comprises breaking content into packets having sizes amendable (with respect to intermediate network characteristics) to packets transmitted between the server and client. While a client player presents a first received packet, the client may decompress a second packet while receiving a third packet. In such fashion, the client may begin the content while it is still being received and processed, hence the term "streaming" of content to the client. RTSP provides for random access to received content, thus one may play, pause, and skip through content.

For more information relating to the RTP, RTCP, and RTSP protocols, and usage thereof, please see Internet Standards Request For Comments (RFC) 1889 ("RTP: A Transport Protocol for Real-Time Applications"), RFC 1890 ("RTP Profile for Audio and Video Conferences with Minimal Control"), and RFC 2326 ("Real Time Streaming Protocol"), which, as of the filing of this document, may be accessed at Uniform Resource Locator (URL) address http_//www_cis_ohio-state_edu/Services/rfc. (Please note, to prevent inadvertent hyperlinks in an online version of this document, the leading colon and periods within the URL have been replaced with underscores.)

FIG. 1 illustrates a simplified representation of one embodiment of a system incorporating the invention. For clarity in presentation, details commonly known to those skilled in the art are left out of the illustration. As shown, a client 100 and a server 106 are in communication over a network 104. It will be appreciated that the network may comprise a variety of wired and wireless portions, see, e.g., FIG. 4 network 422.

The client 100 includes a streaming media player 102, such as the Windows Media Player, or the RealPlayer™ The client receives content sent by the server 106, and the streaming media player is responsible for playing received content. In the illustrated embodiment, the media player is also responsible for signaling transmission characteristics in accord with the RTCP protocol, however it will be appreciated that a separate hardware and/or software component may be responsible for the signalling. In one embodiment, transmission statistics minimally include an indication of packets not received by the client (e.g., lost packets), and network latency. In an alternate embodiment, transmission statistics also include an indication of average transmission bandwidth. In a further embodiment, transmission statistics may include one or more of peak bandwidth, low bandwidth, high/low latency, jitter, client video-rendering frame rate, client audio and/or video hardware specifications, client central processing unit (CPU) specification, and client CPU usage, as such statistics may be used to enhance evaluation of the content received by a client.

It will be appreciated that the client may be configured with a player plug-in, or other application program, operable during playback of content so that the client may send the server arbitrary data.

The server 106 includes a Quality of Service (QOS) determinator 108 responsible for determining quality of service received by the client. In contrast with QOS determination schemes presently employed in the art, QOS determination can be made server-side based on transmission statistics received from the client. Thus, in illustrated embodiments, the client is not required to send a server portions of received content so that the server may compare received data with sent data; conversely, the server is not required to send the client a portion of sent content to allow the client to perform a comparison between sent data and received data.

Instead, the QOS determinator 108 uses transmission statistics sent by the client to simulate the network connection between the server and the client, and simulate, server-side, the content as it was received by the client. The QOS determinator may then compare any desired portions or attributes of sent content to the simulation of the client-received content. It will be appreciated by one skilled in the art that simulation of the network connection can be arbitrarily precise, depending on the nature and frequency of transmission statistics provided by the client. In one embodiment, based on the RTCP protocol, all lost frames are known to the server. This allows the server to reconstruct an exact copy of client-received content. The term "simulation" is not intended to imply comparing to an approximation of what was received by the client.

Figure 2:
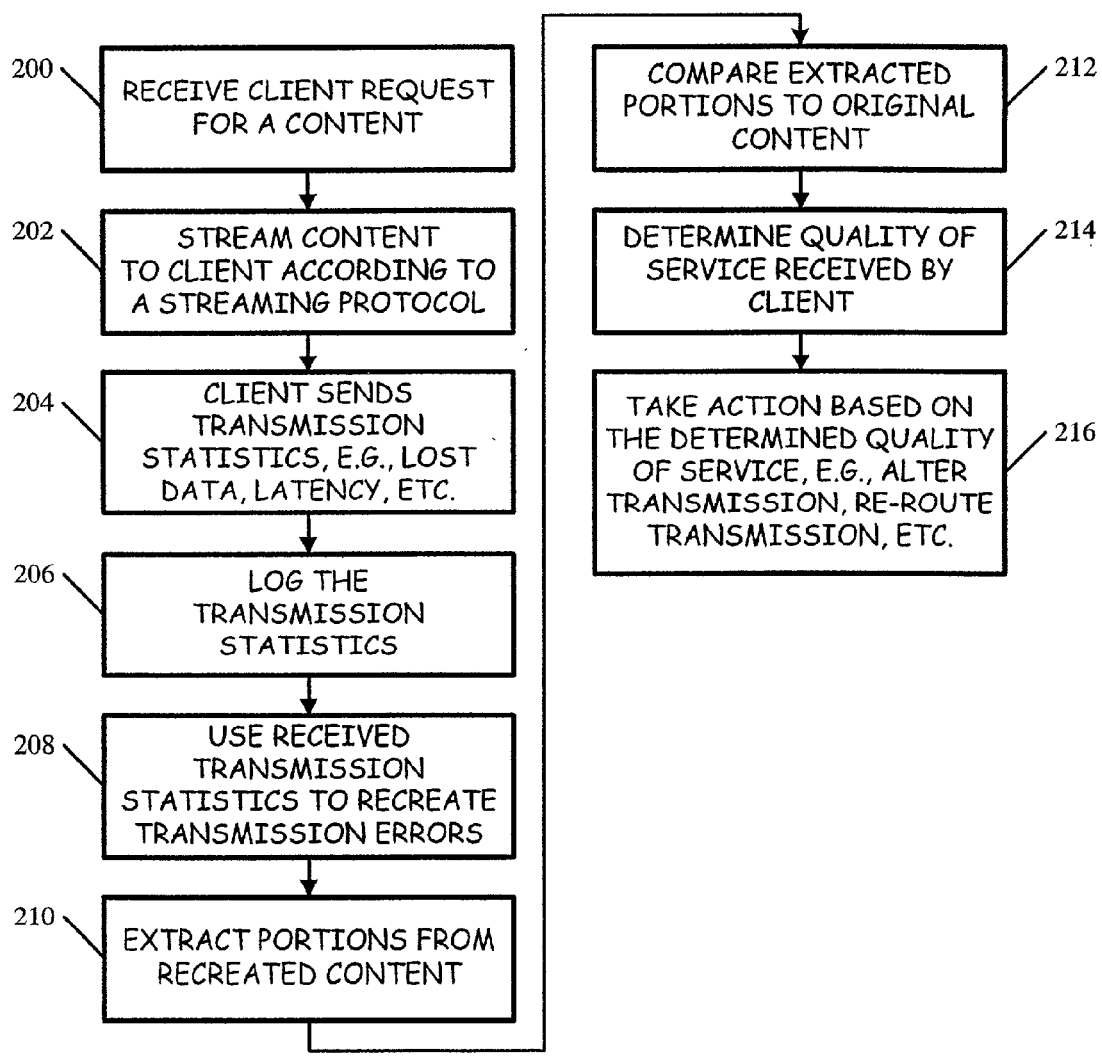
FIG. 2 is a flowchart, according to one embodiment of the invention, illustrating server-side determination of quality of service (QOS) received by the client.

FIG. 2 is a flowchart, according to one embodiment of the invention, illustrating server-side determination of QOS received by the client.

Assuming there is no pre-existing communication channel between the client and the server, a server receives a client request 200 for content to be sent by the server. It is assumed that the request 200 is from a network application program, such as an Internet browser. Although it is assumed the client initiates communication, it will be appreciated that alternate embodiments can allow a server to push content to a client. For example, the server may automatically present content responsive to some action taken by the client, such as in response to loading of a "home" web page of the server, or in response to the client requesting a particular resource from the server. For example, seeking a help resource may trigger sending a "how-to" presentation.

The server streams 202 the content to the client according to a streaming protocol. As discussed above, it is assumed the content is delivered according to the RTP, RTCP, and RTSP (or equivalent) protocols, and that responsive thereto, the client sends 204, e.g., in accord with RTCP or an equivalent protocol, transmission statistics indicating lost data, latency, and/or other data. In one embodiment, the client sends the transmission statistics to the server. In an alternate embodiment, the client sends the transmission statistics to another machine, such as a third-party service responsible for validating the server is meeting QOS obligations. In one embodiment, a machine different from the server is responsible for making QOS determinations for multiple servers. For example, one machine may be responsible for monitoring QOS for multiple servers sending out content.

In one embodiment, sent 204 transmission statistics are logged 206, e.g., received and stored, by the sending server or other machine. In another embodiment, the transmission statistics, are processed on the fly, e.g., in real-time. The sent 204 statistics are used to recreate 208 errors that occurred during presentation. In one embodiment, a network simulator, such as the Cloud or Storm products from Shunra Software Ltd. Of Paramus, N.J., or the Pegasus network monitor from NetIQ Corp. of San Jose, Calif., is used to simulate the quality of the network connection between the client and the server to allow simulating the content received by the client.

In one embodiment, the network simulator bases its simulation only on the received transmission statistics. In another embodiment, the network simulator bases its simulation on the received transmission statistics in conjunction with other data known to the server and/or the network simulator about conditions of the network. It is well known that network simulators may be designed to take various inputs in order to simulate a network, or simulate data sent over the network.

After simulating the client-received content, in one embodiment, a portion of the sent content is extracted 210 and compared 212 against a corresponding portion of the simulated client-received content. In one embodiment, a feature extraction algorithm, such as ANSI T1.801.03-1996 ("American National Standard for Telecommunications—Digital Transport of One-Way Video Signals—Parameters for Objective Performance Assessment"), techniques utilized by Moving Picture Experts Group (MPEG) video processing, or other audio and/or video processing, is used to extract 210 portions from content.

In one embodiment, data associated with content, e.g., meta-data, is used to facilitate determining what feature or features to extract from the content for comparison. For example, knowing content is a news broadcast will allow an extraction algorithm to "look for" a face within the data. Assuming audiovisual content, it will appreciated that the extracted portion of the content may comprise a single frame of the content, or many frames. The comparison allows determination 214 of a quality of service received by the client. It will be appreciated that many different metrics may be applied to determine the quality of service. Appropriate action may be taken 216 based on the determined QOS. Actions include changing how content is sent to a client in order to improve client reception, logging server compliance with QOS requirements, or taking some other action.

Figure 3:
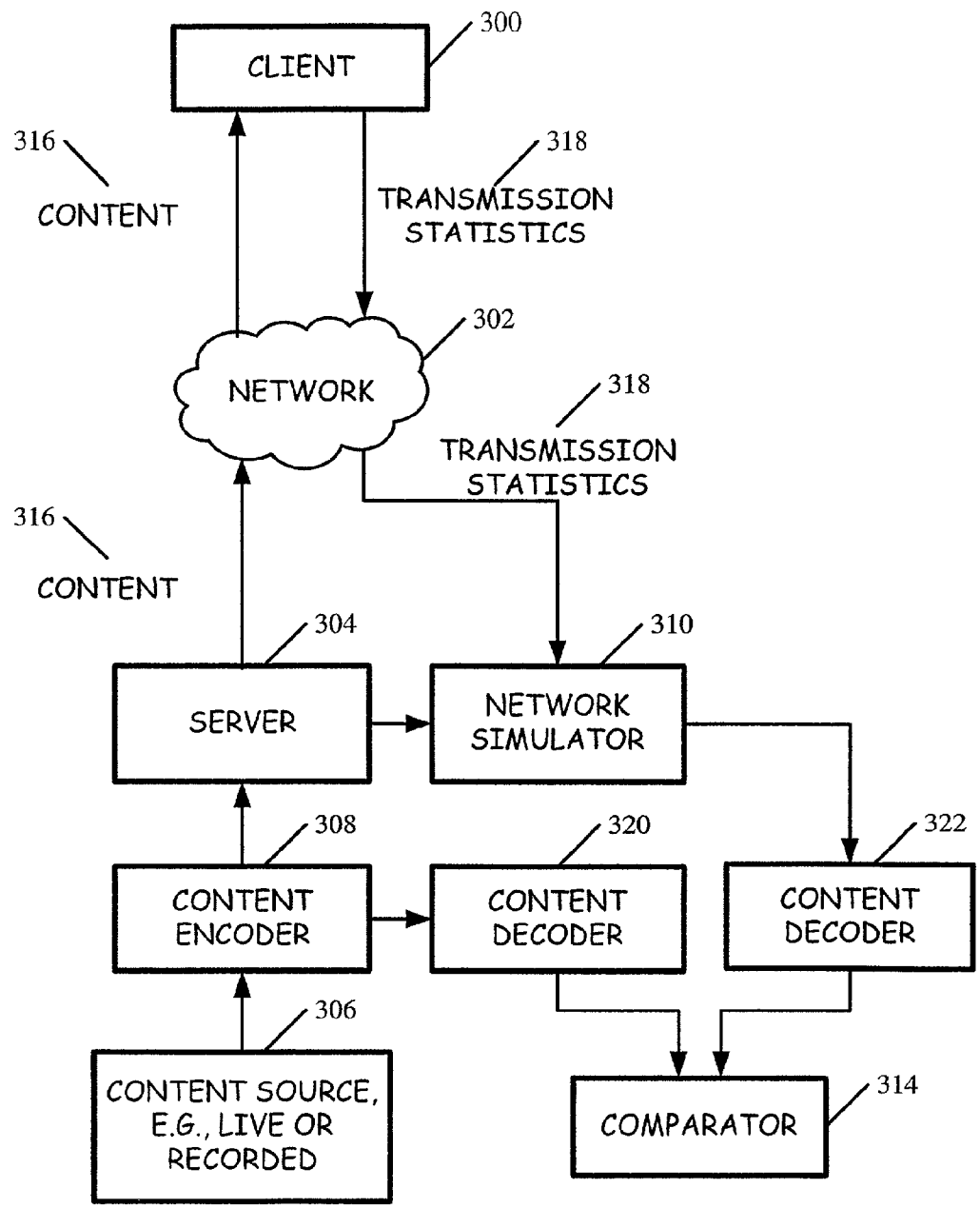
FIG. 3 is a simplified system diagram according to another embodiment of the invention.

FIG. 3 illustrates a simplified system according to one embodiment of the invention. In this embodiment, a client 300 is in communication with a server 304 by way of a network 302. The server sends the client content 316 that originates from content source 306, such as a live video feed, pre-recorded source, or other audio and/or visual source, e.g., a computer generated source, a mix of multiple sources, etc.

The content source is passed to content encoder 308, and the encoded output is sent to the server 304, which in turn sends it over the network 302 to the client 300 according to the RTP, RTCP, and RTSP communication protocols. It will be appreciated that any of a number of audio and/or video encoders may be used as the encoder 308, such as MP3 encoders, MPEG encoders, or the like. Further, although the content encoder and server are depicted as separate machines, they may be combined into a single machine. Also, it will be appreciated that the server and content encoder may be communicatively coupled by way of the network 302, possibly over a secure communication channel through the network.

As discussed above, in accord with the RTCP protocol, the client 300 returns transmission statistics 318 regarding received content. As illustrated, the statistics pass through the network 302 and are received by a network simulator 310. The simulator simulates network conditions between the client 300 and the server 304 based at least in part on the statistics. Although the simulator and server are depicted as separate machines, they may be combined into a single machine. Also, it will be appreciated that the server and simulator may be communicatively coupled by way of a private network.

The output of the simulator is the simulation of the content as received by the client. The simulation may be an approximation, or exact reconstruction of the content received by the client, and in one embodiment, the simulation may be determined entirely based on the statistics returned by the client in the ordinary course of receiving the content in accord with the RTCP protocol. Thus, unlike prior art techniques, the client is not required to incur additional overhead over what is normally required by the protocol in order for the client to receive and process content.

Thus, the server may perform a server-side determination of the quality of service received by the client. To do so, in one embodiment, both the original content and the simulated content are provided to content decoders 320, 322, and their output is compared by a comparator 314. It will be appreciated that various portions of the content and the simulated content, up to and including the entire content, may be compared. In one embodiment, the content decoders 320, 322 are responsible for extracting portions from the content for comparison by the comparator. In another embodiment, the comparator is streamed or otherwise presented with the content, and it performs extraction and comparison. The results of comparison may be used, perhaps in aggregate with comparison results for other clients (not illustrated), to ensure the server is meeting certain quality of service requirements.

Figure 4:
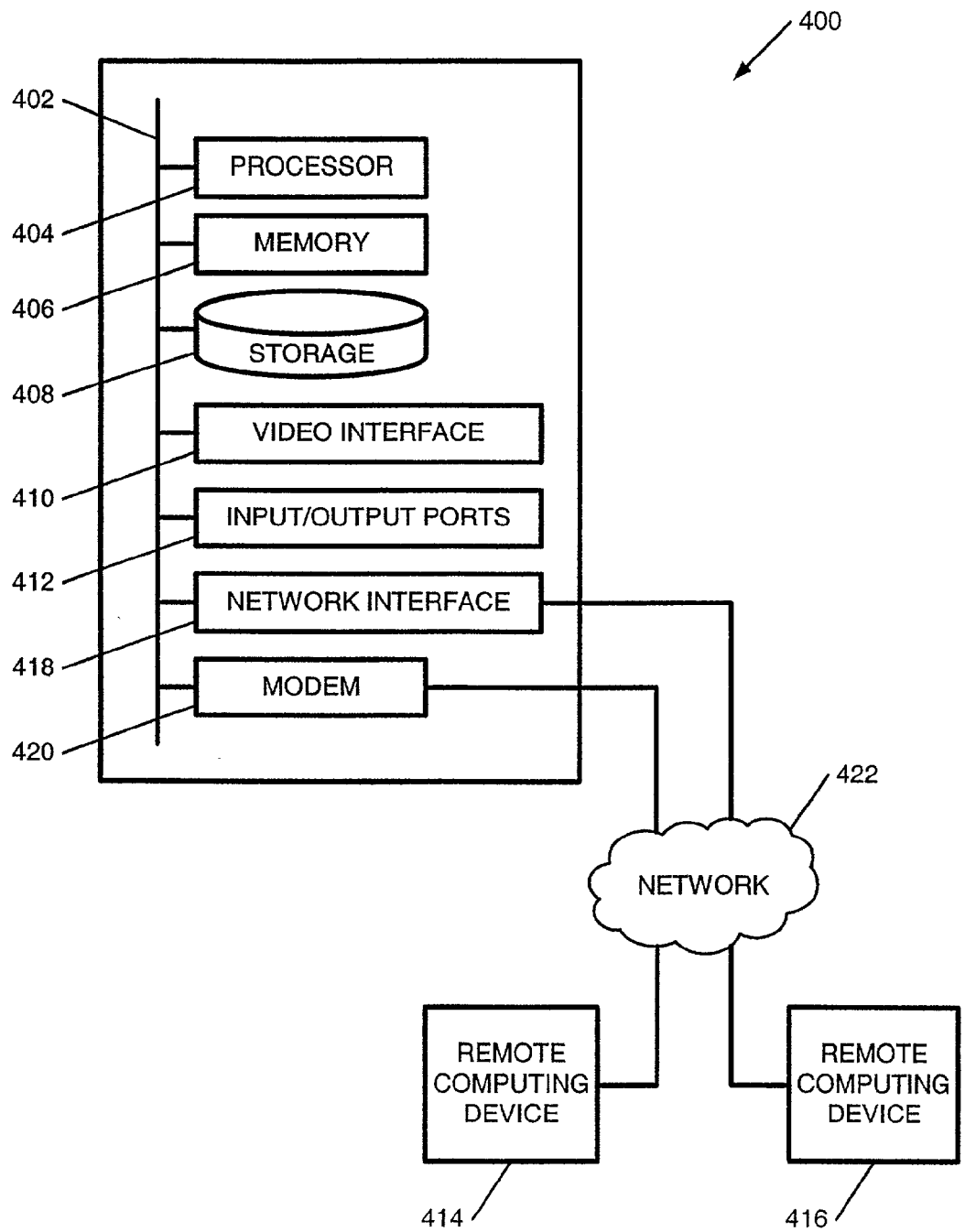
FIG. 4 illustrates a suitable computing environment in which certain aspects of the invention may be implemented.

FIG. 4 and the following discussion are intended to provide a brief, general description of a suitable computing environment in which certain aspects of the illustrated invention may be implemented. An exemplary system for embodying, for example, the clients or servers of FIGS. 1 and 3, includes a machine 400 having system bus 402 for coupling various machine components. Typically, attached to the bus are processors 404, a memory 406 (e.g., RAM, ROM), storage devices 408, a video interface 410, and input/output interface ports 412.

The system may also include embedded controllers, such as Generic or Programmable Logic Devices or Arrays (PLD, PLA, GAL, PAL), Field-Programmable Gate Arrays (FPGA), Application Specific Integrated Circuits (ASIC), single-chip computers, smart cards, or the like, and the system is expected to operate in a networked environment using physical and/or logical connections to one or more remote systems 414, 416 through a network interface 418, modem 420, or other pathway. Systems may be interconnected by way of a wired or wireless network 422, including an intranet, the Internet, local area networks, wide area networks, cellular, cable, laser, satellite, microwave, "Blue Tooth" type networks, optical, infrared, or other carrier.

The invention may be described by reference to program modules for performing tasks or implementing abstract data types, e.g., procedures, functions, data structures, application programs, etc., that may be stored in memory 406 and/or storage devices 408 and associated storage media, e.g., hard-drives, floppy-disks, optical storage, magnetic cassettes, tapes, flash memory cards, memory sticks, digital video disks, biological storage, as well as transmission environments such as network 422 over which program modules may be delivered in the form of packets, serial data, parallel data, or other transmission format.

Illustrated methods and corresponding written descriptions are intended to illustrate machine-accessible media storing directives, or the like, which may be incorporated into single and multi-processor machines, portable computers, such as handheld devices including Personal Digital Assistants (PDAs), cellular telephones, etc. An artisan will recognize that program modules may be high-level programming language constructs, or low-level hardware instructions and/or contexts, that may be utilized in a compressed or encrypted format, and may be used in a distributed network environment and stored in local and/or remote memory.

Thus, for example, with respect to the illustrated embodiments, assuming machine 400 operates as client 300 (FIG. 3), then remote devices 414, 416 may respectively be sever 304 and network simulator 310. It will be appreciated that remote machines 414, 416 may be configured like machine 400, and therefore include many or all of the elements discussed for machine. It should also be appreciated that machines 400, 414, 416 may be embodied within a single device, or separate communicatively-coupled components.

Having described and illustrated the principles of the invention with reference to illustrated embodiments, it will be recognized that the illustrated embodiments can be modified in arrangement and detail without departing from such principles. And, even though the foregoing discussion has focused on particular embodiments, it is understood other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments, and unless indicated otherwise, embodiments are combinable into other embodiments.

Consequently, in view of the wide variety of permutations to the above-described embodiments, the detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for a server-side determination of received quality of service, comprising:
   transmitting content over a network;
   receiving transmission statistics regarding the transmitted content;
   simulating the network based at least in part on the transmission statistics;
   estimating an effectiveness of the transmitting the content based at least in part on the simulated network;
   determining an estimated transmission of content based at least in part on a selected one of the transmission statistics and the estimated effectiveness; and
   comparing at least a portion of the content to at least a portion of the estimated transmission of content to determine a quality of service for transmitting the content.

2. The method of claim 1, wherein simulating the network comprising:
   estimating data loss of the transmitting the content over the network.

3. The method of claim 1, wherein the transmitting the content is according to a protocol in which a receiver of the content is to periodically send transmission statistics regarding the transmitted content.

4. A method for a server-side determination of received quality of service, comprising:
   transmitting content over a network;
   receiving transmission statistics regarding the transmitted content;
   simulating the network based at least in part on the transmission statistics;
   estimating an effectiveness of transmitting the content based at least in part on the simulated network;
   determining an estimated transmission of content based at least in part on a selected one of the transmission statistics and the estimated effectiveness; and
   comparing a video feature of the content to at least a corresponding video feature of the estimated transmission of content to determine a quality of service for transmitting the content.

5. A method for determining received quality of service, comprising:
   receiving content by at least one receiver;
   determining by the at least one receiver transmission statistics for the content based at least in part on receiving the content; and
   sending the transmission statistics to a machine communicatively coupled to a simulator for simulating transmission losses for the content received by the receiver based at least in part on the transmission statistics;
   wherein the machine is configured to determine an estimated transmission of content based at least in part on the determined transmission effectiveness, and configured to compare a portion of the content to a corresponding portion of the estimated transmission of content so as to determine a quality of service.

6. The method of claim 5, wherein the content is received from the machine.

7. The method of claim 5, wherein the machine determines a transmission effectiveness for the content based at least in part on a simulated network.

8. The method of claim 5, further comprising:
   wherein the machine is configured to determine an estimated transmission of content based at least in part on the transmission statistics; and
   wherein the machine is configured to compare a portion of the content to a corresponding portion of the estimated transmission of content so as to determine a quality of service.

9. A system comprising:
   a first machine configured to perform:
      transmitting content over a network; and
      receiving transmission statistics regarding the transmitted content;
   a second machine configured to simulate the network based at least in part on the transmission statistics;
   a third machine configured to estimate an effectiveness of the transmitting the content based at least in part on the simulated network, and to determine an estimated transmission of content based at least in part on the estimated effectiveness of the transmitting the contents
   comparing at least a portion of the content to at least a portion of the estimated transmission of content to determine a quality of service for transmitting the content.

10. The system of claim 9, wherein selected ones of the second machine and the third machine are disposed within the first machine.

11. The system of claim 10, further comprising:
    a fourth machine configured to perform:
       receiving the content;
       determining transmission statistics for the content based at least in part on receiving the content; and
       sending the transmission statistics to the first machine.

12. An article, comprising:
    a machine-accessible media having associated data, wherein the data, when accessed, results in a machine performing:
    transmitting content over a network;
    receiving transmission statistics regarding the transmitted content;
    simulating the network based at least in part on the transmission statistics;
    estimating an effectiveness of transmitting the content based at least in part on the simulated network;
    determining an estimated transmission of content based at least in part on a selected one of the transmission statistics and the estimated effectiveness; and
    comparing at least a portion of the content to at least a portion of the estimated transmission of content to determine a quality of service for the transmitting the content.

13. The article of claim 12 wherein the machine-accessible media further includes data, when accessed by the machine, results in the machine performing:
    estimating data loss of the transmitting the content over the network.

14. The article of claim 12, wherein the transmitting of the content is according to a protocol in which a receiver of the content is to periodically send transmission statistics.

15. An article, comprising:
a machine-accessible media having associated data, wherein the data, when accessed, results in a machine performing:
transmitting content over a network;
receiving transmission statistics regarding the transmitted content;
simulating the network based at least in part on the transmission statistics; and
estimating an effectiveness of the transmitting the content based at least in part on comparing the simulated network with at least the transmitted content;
determining an estimated transmission of content based at least in part on a selected one of the transmission statistics and the estimated effectiveness; and
comparing a video feature of the content to at least a corresponding video feature of the estimated transmission of content to determine a quality of service for transmitting the content.

16. A machine accessible medium having instructions encoded thereon capable of directing one or more machines to perform:
receiving content by at least one receiver;
determining by the at least one receiver transmission statistics for the content based at least in part on receiving the content;
determining an estimated transmission of content based at least in part on a simulation of transmitting the content, the simulation based at least in part on the transmission statistics; and
comparing a portion of the content to a corresponding portion of the estimated transmission of content so as to determine a quality of service.

17. The machine accessible medium of claim 16, wherein the instructions are received from the machine.

18. The machine accessible medium of claim 16, wherein the machine determines a transmission effectiveness for the transmitted content based at least in part on the simulated network.

19. A machine accessible medium having instructions encoded thereon capable of directing the machine to perform:
receiving content by at least one receiver;
determining by the at least one receiver transmission statistics for the content based at least in part on receiving the content;
sending the transmission statistics to a machine communicatively coupled to a simulator for simulating the network based at least in part on the transmission statistics;
wherein the instructions further comprise instructions capable of directing the machine to determine an estimated transmission of content based at least in part on the transmission statistics; and
wherein the instructions further comprise instructions capable of directing the machine to compare a portion of the content to a corresponding portion of the estimated transmission of content so as to determine a quality of service.

20. A method for a server-side determination of received quality of service for a propagated signal, comprising:
propagating a signal comprising user perceptible content;
receiving propagation statistics regarding the propagated signal;
simulating the propagating the signal based at least in part on the propagation statistics;
estimating an effectiveness of propagating the signal based at least in part on the simulated propagating signal;
determining an estimated transmission of content based at least in part on a selected one of the propagation statistics and the estimated effectiveness; and
comparing at least a portion of the content to at least a portion of the estimated transmission of content to determine a quality of service for transmitting the content.

21. The method of claim 20, further comprising:
wherein simulating the propagating the signal comprises estimating data loss of the propagating the signal, and wherein propagating the signal is according to a protocol in which a receiver of the propagated signal is to periodically send propagation statistics regarding the received propagated signal.

22. A method for a server-side determination of received quality of service, comprising:
transmitting content over a network;
receiving transmission statistics regarding the transmitted content;
determining an estimated received content based at least in part on a simulation of transmitting the content, the simulation based at least in part on the transmission statistics;
comparing at least a portion of said transmitted content with at least a portion of the estimated received content to determine a quality of service for the transmitting the content.

23. The method of claim 22, wherein determining the received content comprises estimating data loss for said transmitting the content.

* * * * *